United States Patent [19]

Renzo

[11] Patent Number: 5,591,464
[45] Date of Patent: Jan. 7, 1997

[54] MOLDING PLANT FOR CONVEYING MOLDS FOR CHOCOLATE OR SIMILAR PRODUCTS

[75] Inventor: Cerboni Renzo, Milan, Italy

[73] Assignee: Carle & Montanari S.p.A., Milan, Italy

[21] Appl. No.: 325,890

[22] Filed: Oct. 19, 1994

[30] Foreign Application Priority Data

Oct. 21, 1993 [IT] Italy .................... MI93A2236

[51] Int. Cl.⁶ .................................................. B29C 39/06
[52] U.S. Cl. ............... 425/453; 425/457; 425/DIG. 200; 425/DIG. 201
[58] Field of Search ..................... 425/453, 454, 425/457, DIG. 200, DIG. 201; 249/126, 120, 119

[56] References Cited

U.S. PATENT DOCUMENTS

| | | | |
|---|---|---|---|
| 3,082,709 | 3/1963 | Jacobsen | 425/453 |
| 3,778,018 | 12/1973 | Abalo | 425/453 |
| 3,981,656 | 5/1976 | Steels et al. | 425/453 |
| 4,135,872 | 1/1979 | Cerboni | 425/453 |
| 4,330,245 | 5/1982 | Billett et al. | 425/126 |
| 4,954,069 | 9/1990 | Friedwald | 425/453 |

FOREIGN PATENT DOCUMENTS

| | | | |
|---|---|---|---|
| 0039514 | 11/1981 | European Pat. Off. | |
| 731323 | 5/1975 | Netherlands | 425/453 |

*Primary Examiner*—Khanh P. Nguyen
*Attorney, Agent, or Firm*—Darby & Darby

[57] ABSTRACT

A molding plant for conveying molds, preferably molds for chocolates or similar products. A drive shaft, which includes conveying screws mounted on a shaft, conveys the molds along a processing path through stations in the plant. The underside of each mold has downwardly projecting studs or projections that engage between threads of the conveying screws. The studs are arranged such that the molds can be conveyed along at least two different, transverse processing paths. Preferably, the studs are positioned such that the engagement between the studs and the screws is along a midline of the molds.

20 Claims, 7 Drawing Sheets

MOLDING PLANT FOR CONVEYING MOLDS FOR CHOCOLATE OR SIMILAR PRODUCTS

BACKGROUND OF THE INVENTION

The present invention relates to a molding plant for chocolate or similar products.

Plants for molding chocolate or suchlike products are known in the prior state of the art, and these plants generally consist of horizontal guides on which the molds, which are generally parallelepipedal in form and have wells into which, for example, the liquid chocolate is to be injected, can be moved.

Along the mold translation guides, which may reach considerable lengths of up to some hundreds of metres, there are cooling devices whose function is to solidify the chocolate in the molds. In addition, the known plant is provided with inverting devices which enable the mold to be rotated through 180° so as to empty it. Devices are also provided for heating the forms, as are knocking units which act directly on the mold. Furthermore the molding plant is generally equipped with devices for cleaning the mold, which after emptying has to be returned to the molding path.

In known molding plants, the conveyance of the molding forms is performed by means of conveying chains that have projecting catches and that run along supporting guides so as to convey the molding forms along the plant.

For some time now the use of chains to move the molding forms has been found to be disadvantageous and complex from the technical point of view. This is because in order to drive ordinary chain conveyors, reducers, transmission shafts, universal joints and advancing mechanisms, having for example a device fitted with a Geneva wheel, are required. The plurality of devices must be distributed along the plant which may be of considerable length, with the result that the assembling and synchronizing of the auxiliary devices and their maintenance constiutes a significant cost.

It has been found that when using chains fitted with catches to move the molds, the speed of advance of the molds cannot be too great because an excessive speed of advance would subject the molds to high accelerations and decelerations, causing the molds to separate from the driving catches and losing the guiding action and the precise geometrical positioning between the catch and the mold, a positioning which has in fact to be maintained rigorously in order to guarantee the reliable operation of the molding plant, which is synchronized with other operating units.

Attempts have been made to overcome in part the problem arising from high acceleration or deceleration by providing runner guides for the molds characterized by a high coefficient of friction, but this requires not only more electrical power but also causes accentuated mechanical wear of the parts involved.

When chains are used for conveying the molds in a molding plant, irregular lengthening of the drive chains is to be observed, due both to thermal expansions that cannot be compensated for and from [sic] normal wear of the chain parts. These lead to imprecise positioning of the molding forms relative to the various operating units connected to the molding line, such as for example the device that fills the wells with the liquid chocolate. The result of this imprecise positioning between the parts is bad production in the form of an imperfectly molded product, or a finished product of poor quality is produced.

Another problem typical of molding plants in which the molds are conveyed by chains is to be seen in the fact that it is essential to lubricate the chains and their drive wheels, and this means that there is a danger of contaminating the product contained in the molds, since the conveying chains are usually located immediately adjacent to the molds containing the product and the lubricant is therefore free to migrate without obstruction along various routes, eventually reaching the chocolate, which will suffer a loss of quality.

Moreover, since each molding plant requires hundreds of metres of drive chain, such a plant will obviously also require continuous adjustments to the members controlling the guide means and synchronizing means because the inevitable lengthening of the chains is prejudicial to their reliable operation and has a negative influence on the entire automation system of the plant.

The presence of chain conveyors in molding plants is a source, furthermore, of soiling and contamination of the entire plant because the chains distribute residues of chocolate around the full extent of the plant.

Owing to the particular technical configuration of a chain, and to the configuration of the various transmission and synchronization members, continuous cleaning operations during the running of the plant in operation are practically impossible. One reason is that in order to recover the not inconsiderable costs of a chocolate molding plant, the plant is used ever more intensively and during more than one shift. Hence to stop the plant for cleaning operations (quite apart from the technical difficulty of carrying out these cleaning operations) would create a serious cost. Last of all, a disadvantage of known plants is the fact that the very long conveying chains suffer, after a period of time, so much wear that the chain has to be replaced, which involves a rather long period of machine stoppage and high costs.

Another disadvantage of molding plants in which the molds are advanced by chains is to be seen in the fact that it is not possible to move the molds conveniently in the different horizontal directions, that is forwards/backwards, left/right, and in the vertical direction, up/down.

This fact makes it very difficult to adapt to changing technological demands resulting from modern molding procedures; moreover, molds with variable dimensions (width/length) cannot be used in known plants without substantial technical modifications to the plant.

SUMMARY OF THE INVENTION

It is an object of the present invention to overcome the disadvantages described above by proposing a novel molding plant capable above all of guaranteeing excellent product quality; another object of the invention is to overcome the disadvantages caused by using conveying chains, by simplifying as much as possible the structure of the members for moving the chocolate molds and also sharply reducing the times for any necessary maintainance, thereby increasing the efficiency of the plant, and by proposing handling means that offer precise guidance of the molds, controlled and faster handling of the molds, and a decrease in the amount of energy required to move the molds around the track of the molding plant.

The objects of the present invention are achieved by means of a molding plant characterized by the fact that at least one driven conveying screw, with which the molds to be conveyed engage, is combined with the parallel mold supporting guides.

With a handling means in the form of a screw, it will be possible to use, to support the lateral ends of the molds, very simple guide means, for example guides formed by simple rods, for between the mold advancing screw and the studs projecting from the molds it is possible to create a reliable geometric coupling between mold and screw which permits a very rapid, very reliable and precise mold advancing movement.

By making the body of the screw and the studs projecting from the molds in a low-friction material it will be possible to dispense with any form of lubrication and so avoid undesirable contamination of the product contained in the mold wells.

Moreover the cooling, inverting, direction-changing, lifting and knocking units can be greatly simplified from the point of view of construction because of the absence of conveying chains.

BRIEF DESCRIPTION OF THE DRAWINGS

The subject designed according to the present invention will now be described in greater detail in the form of an embodiment which is provided purely by way of an example and illustrated in the accompanying drawings, in which.

DETAILED DESCRIPTION OF THE PREFERRED EMBODIMENTS

Figure 1:
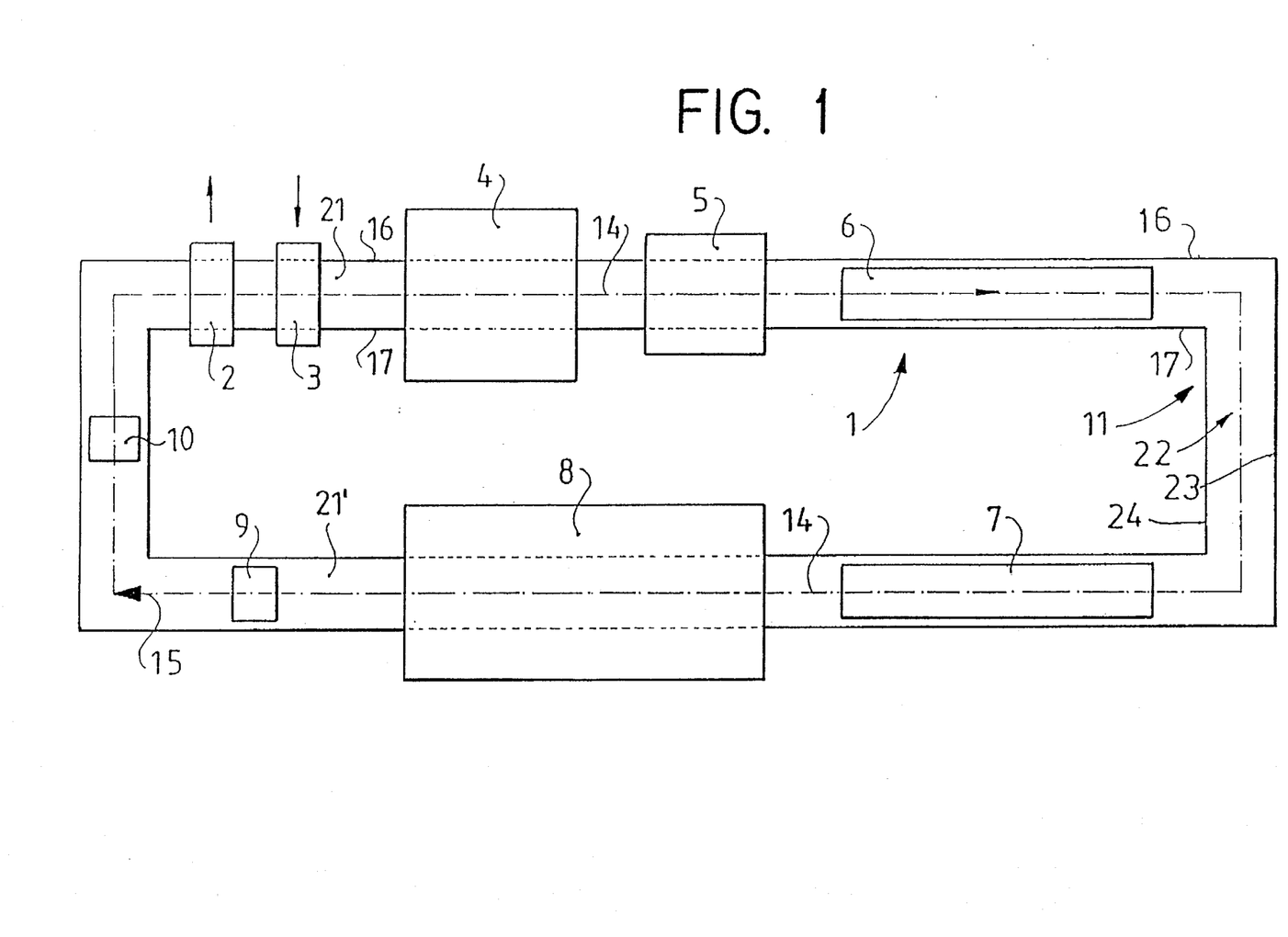
FIG. 1 shows a schematic plan view of a molding plant designed according to the invention.

As can be seen in FIG. 1, the molding plant denoted 1 as a whole has a mold unloading station 2 and a mold feeding station denoted 3.

4 denotes a mold heating unit followed by a metering 5 unit for feeding the liquid chocolate, which is followed by a knocking device 6 for levelling the product.

The device 6 is followed by another knocking unit 7 which in turn is followed by a refrigerator unit 8, at the exit of which is an inverting device 9 and a righting unit 10.

All the operating units indicated thus far are intended to be in combination with a path of translation, denoted 11 as a whole, and arranged in the form of for example a closed ring.

The conveying path, whose total length may be as much as some hundreds of metres, is basically composed of parallel guides 16 and 17 supporting the ends of the molds (not shown in FIG. 1).

The molds are moved by at least one screw 14 located between the guides 16 and 17. At the point denoted 15, the product is unloaded from the plant, while the molds will be unloaded at location 2.

Figures 2, 2A:
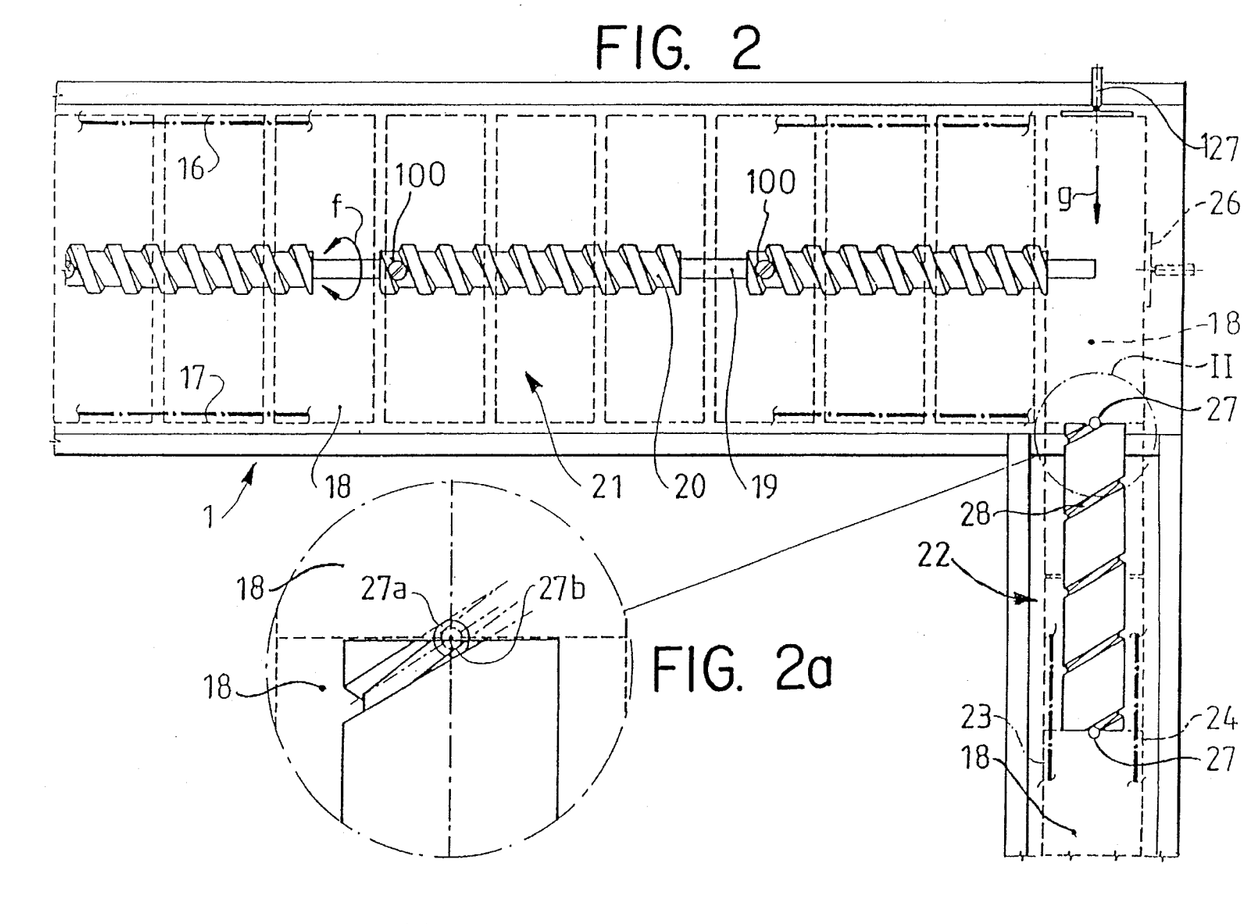
FIG. 2 shows a detail of the molding plant in plan view.
FIG. 2a shows detail II from FIG. 2 on a larger scale.

As can be seen in FIG. 2, the molding plant 1 comprises lateral guides 16 and 17 supporting the ends of the molds 18, indicated schematically only in FIG. 2.

In order to move the molds 18, there is supported between the guides 16 and 17 of the molding plant 1 at least one drive shaft 19, which extends along the entire straight portion of the molding plant. The drive shaft 19 can be turned by a known mechanism, for example a controllable electric motor. The rotating movement of the shaft 19, which can be in either direction, is indicated schematically by the arrow f.

Mounted on the shaft 19 are separate bodies that form screws 20 which are advantageously made as interchangeable parts. Advantageously, the screws 20 are made in a very strong synthetic material with excellent sliding characteristics.

In order to avoid deformations, for example as a result of thermal variations, the screws 20 are fastened to the shaft 19 at one end only, using for this purpose a threaded pin 100, so that the body of the screw 20 is free to lengthen or contract without obstruction.

At the end of the path 21 formed by the parallel guides 16 and 17, there is another path 22 arranged at right angles to the path 21 and defined by guides 23 and 24 to receive the longitudinal ends of the molds 18. Once again, at least one translation screw 25 is supported between the parallel guides 23, 24 on which the molds 18 are supported. At the end of the parallel guides 16, 17 that define the path 21 is an arresting stop denoted 26. Turned through 90° at the end of the track 21 is a displacing means 127, for example a cylinder-and-piston unit.

When the cylinder-and-piston unit 127 receives a signal generated by the arresting stop 26, which indicates that a mold 18 is in the terminal position, the cylinder-and-piston unit 127 is activated and displaces the mold 18 transversely as indicated by the arrow g.

The molds 18 have downward-pointing studs 27 at their narrower ends. These studs 27 come into contact with the turns 28 of the screw 25 of the path 22 that conveys the molds transversely along the guides 23, 24.

FIG. 2a shows in greater detail that, advantageously, each mold 18 has a projection forming a half-body 27a, 27b at each of its (narrower) ends, a fact which offers the possibility of keeping the molds 18 together during their transverse conveyance along the track 23, 24 where there are no supplementary units for processing the chocolate.

Figures 3, 3A:
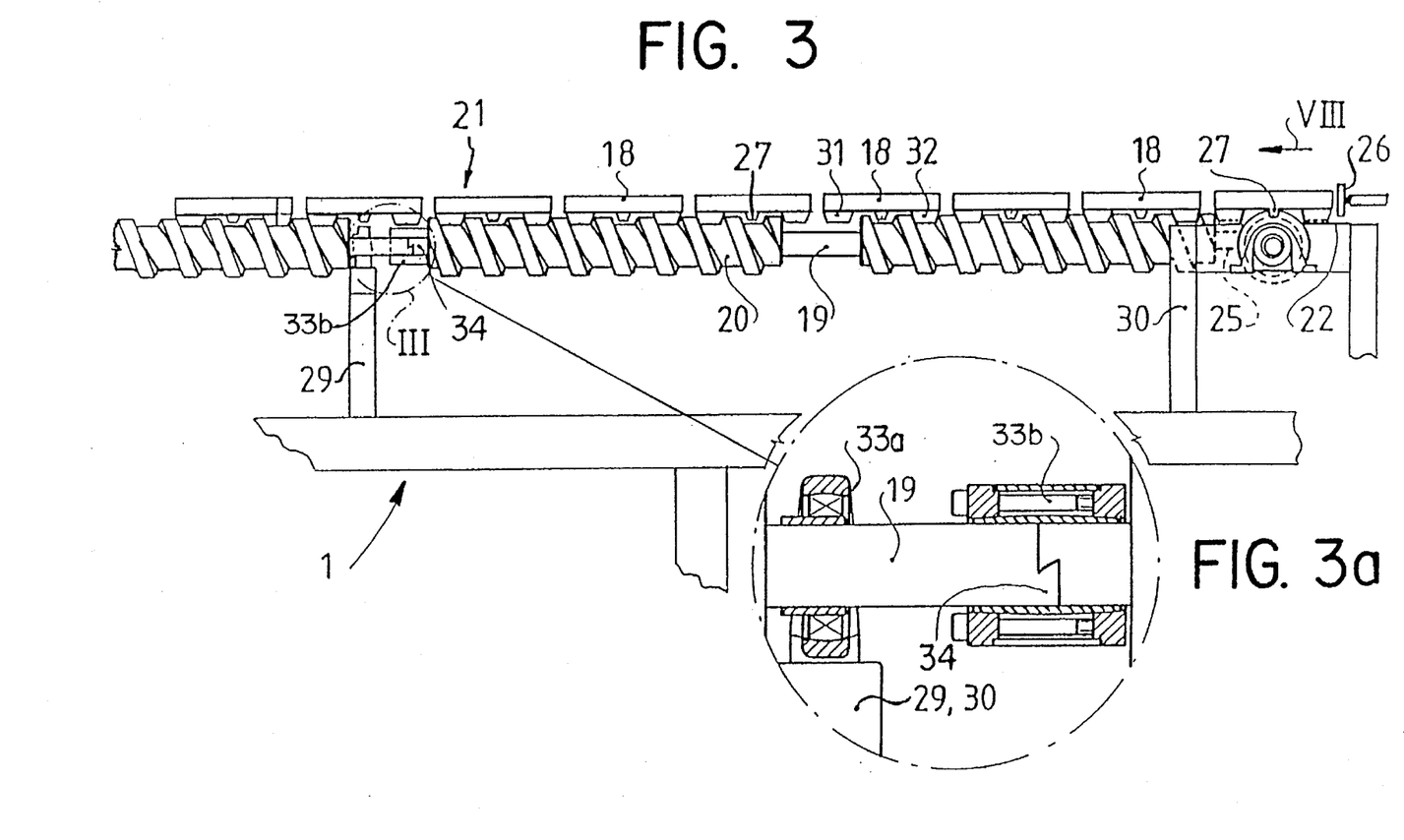
FIG. 3 shows a front view of the molding plant.
FIG. 3a shows detail III from FIG. 3 on a larger scale.

FIG. 3 shows the conveying path 21 and transverse path 22 in front view. As can be seen, the structure of the molding plant 1 is extremely simple and functional, because apart from the guides for the lateral support of the molds, the only parts required are simple supporting uprights 29, 30 to support the shaft 19 and the screw 20.

Engaging with the turns of the screw(s) 20 are the studs 31 and 32 located advantageously in the centre of the mold 18 on its front side and rear side.

FIG. 3 also shows that the projections 27 located at the ends of the mold do not come into contact with the turns of the screw 20 during the longitudinal conveyance (path 21) of the molds 18. Moreover, it can also be seen in FIG. 3 that the studs 27 come into engagement with the turns of the screw 25 only while the molds 18 are being conveyed along the transverse path 22.

FIG. 3a shows that the shaft 19 is supported on each upright 29, 30, for example via a bearing 33. The drive shaft 19 is advantageously divided into a number of parts assembled together by means of profiles or joints that are coupled together by means of a profile 34, similar to a dovetail.

In order to keep the ends of the shaft 19 with the profile 34 coupled together, the ends of the shaft 19 are held in a known flexible coupling 33b or in a known conical clamping coupling.

Figure 4:
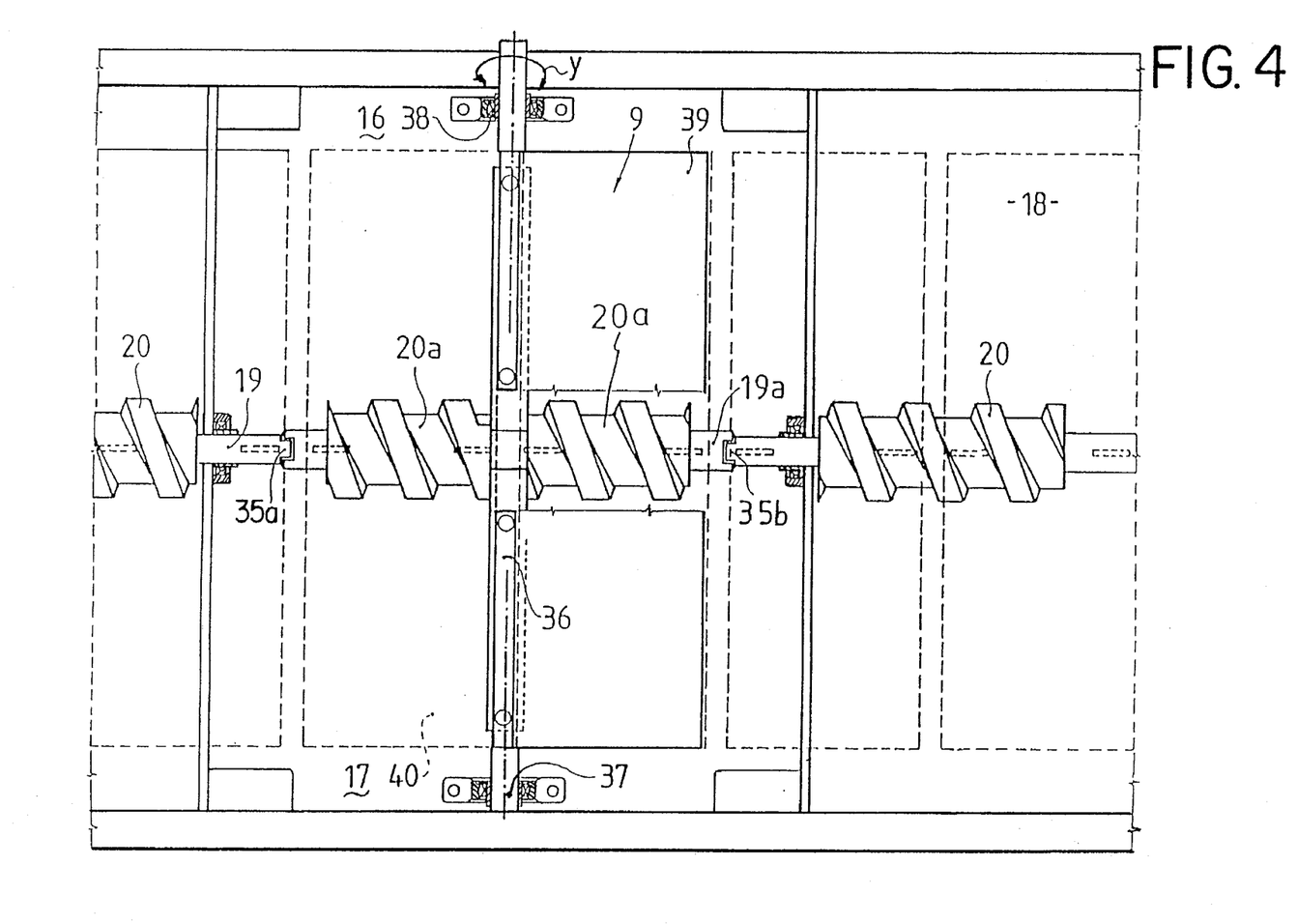
FIG. 4 shows a plan view of an inverting unit installed in the path of the molding plant.

FIG. 4 shows an inverting device denoted 9 as a whole and positioned on the conveying path between the guides 16 and 17.

The inverter consists basically of a screw 20a whose shaft 19a is connected to the shafts 19 of the front and rear screws 20 by means of geometrical couplings denoted 35a, 35b respectively.

The geometrical coupling 34, 35 may consist of an end in the form of a tenon and a groove-like end, which parts are coupled together and enabling [sic] the shaft 19 and shaft 19a supporting the screw 20a to disengage.

The screw 20a is supported pivotably by a transverse bar 36 supported rotatably on bearings 37 and 38 mounted at the ends of the bar 36 and fixed beyond the dimensions of the mold 18. Integral with the transverse bar 36 are supporting plates 39 and 40 designed to accommodate the molds 18.

Figure 5:
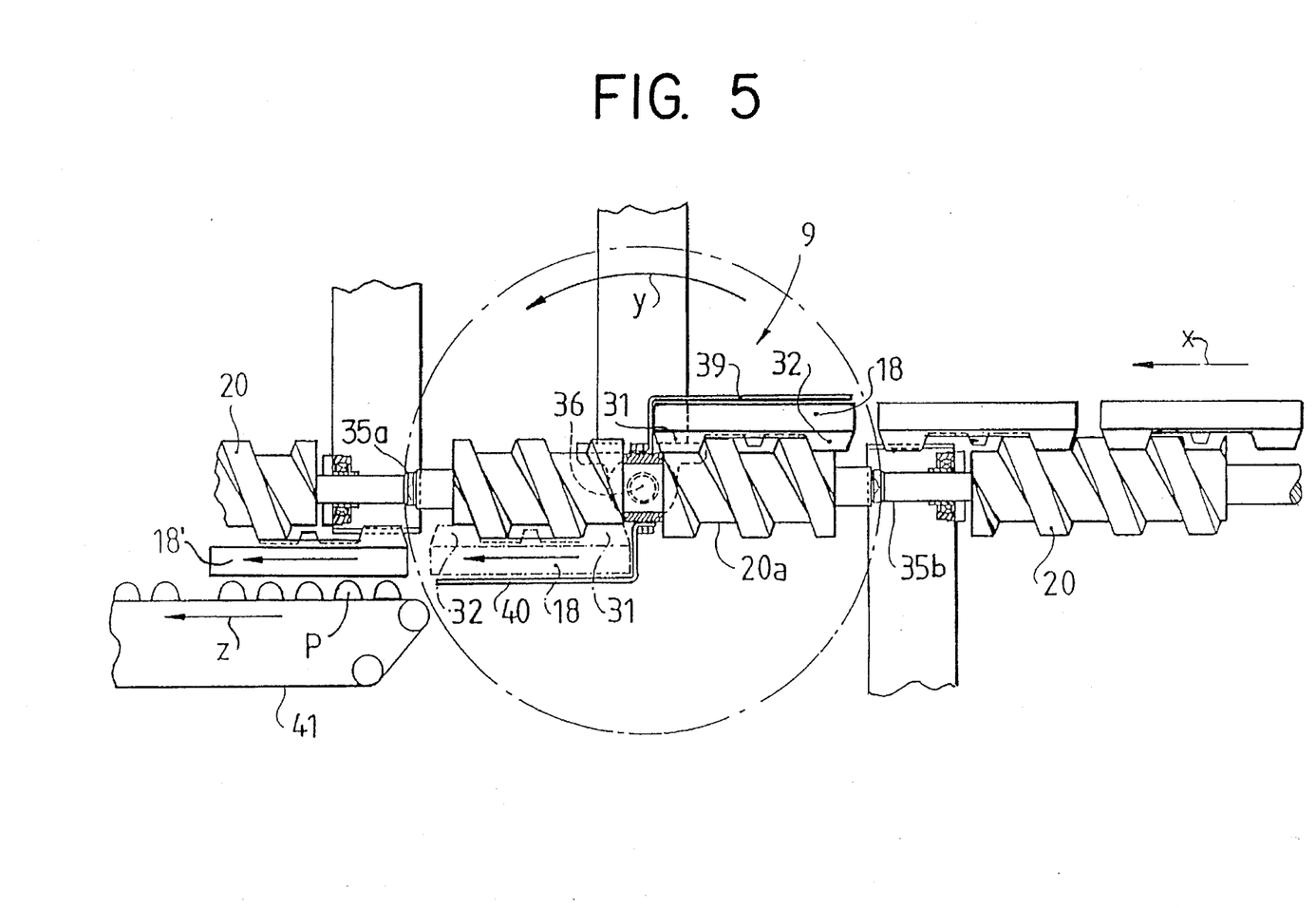
FIG. 5 shows a front view of the molding plant.

FIG. 5 shows the rotatable bar 36, through which runs the core of the screw 20a. The transverse bar 36 supports the plates 39 and 40 which define accommodating chambers for the molds 18 fed by the main screw 20 in the direction indicated by the arrow (X).

As the inverting unit 9 rotates in the direction indicated by the arrow (Y), the mold 18 fed to the chamber defined by the plate 39, by means of the screw 20, can be swung over into a position underneath, as indicated in FIG. 5. It should be noted that the studs 31 and 32 of the mold 18 remain in engagement with the turns of the screw 20a even in the inverted position. Underneath the upturned mold 18' (in the upturned position this mold 18' is supported by means of angular sections not illustrated in detail) is a conveyor belt 41 on which the finished products P are deposited before being carried away from the plant in the direction indicated by the arrow Z.

Figure 6:
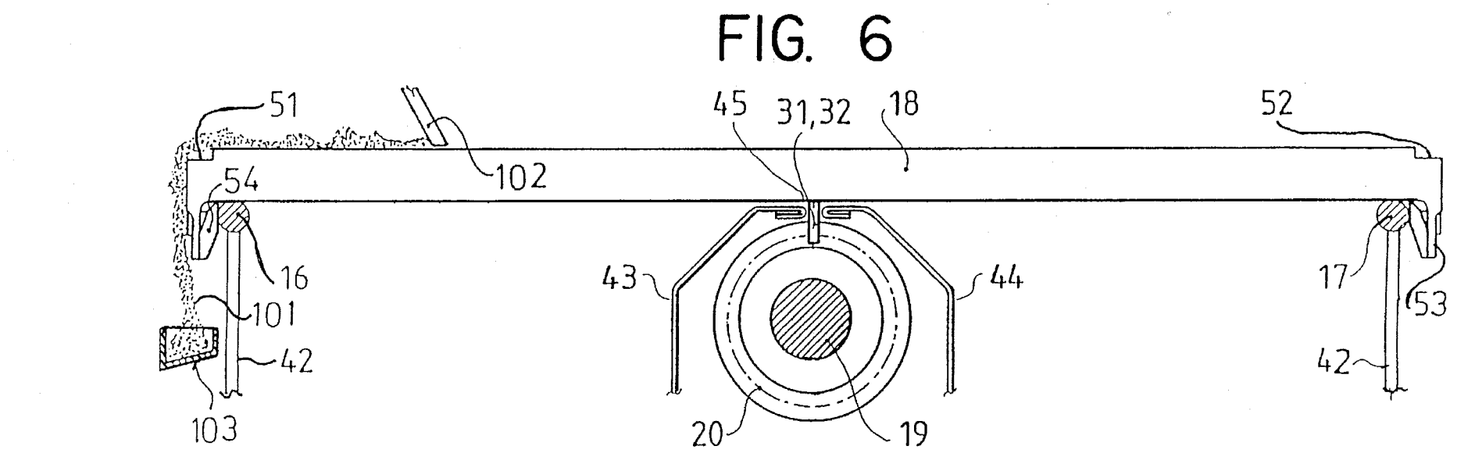
FIG. 6 shows the mold displacing screw on an enlarged scale.

FIG. 6 indicates a mold 18 supported by the guides 16 and 17. Also visible are the shaft 19 and the screw 20 in front view and partly in section. Of interest is the fact that the guides 16 and 17 consist of simple rods supported by uprights 42.

The shaft 19 and the screw 20 are completely shielded by a barrier formed by plates 43 and 44 which define a very narrow slot 45 at the top, into which the studs 31 and 32 projecting from the underside of the mold 18 pass so as to engage with the turns of the screw 20.

The plates 43, 44 form a means for support for the mold 18 at its centre, a fact which is especially useful when the molds are very long and heavy. Furthermore the rotating parts 19, 20 are shielded completely, avoiding any risk of accident, and also dust and dirt are prevented from being deposited undesirably on the turns of the screw 20 so that the risk of bacteriological contamination is eliminated.

With particular advantage, as can be seen in detail in the illustration of FIG. 6 (and FIG. 10), the mold 18 has recesses 51 and 52 on the top and projecting ribs 53 and 54 on the bottom.

Figure 10:
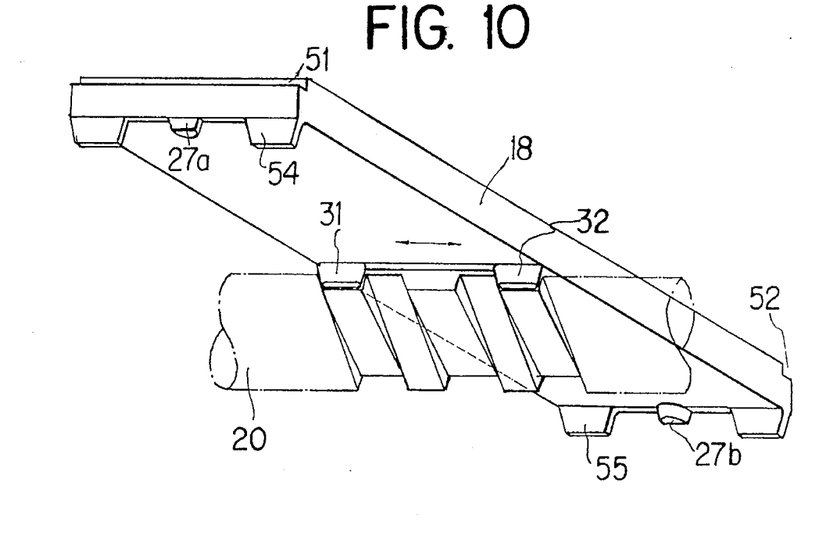
FIG. 10 shows a perspective view of the conveying screw with a mold.

These provisions are particularly advantageous for when stacking empty molds or full molds 18, the ribs 53, 54 of a higher mold being inserted in the recesses 51, 52 of a lower mold. These provisions greatly increase the stability of a stack of molds 18 formed either for storage purposes or for purposes of vertical conveyance, for example in a refrigerator.

The ribs 53, 54 also act as guide means with respect to the parallel guides 16, 17. These guides 16, 17 are also covered or shielded by the ribs 53, 54 during the unloading of the product 101 which is scraped off by a blade 102 from the mold 18 and collected in troughs 103 which are advantageously located alongside the guides 16, 17.

Figure 7:
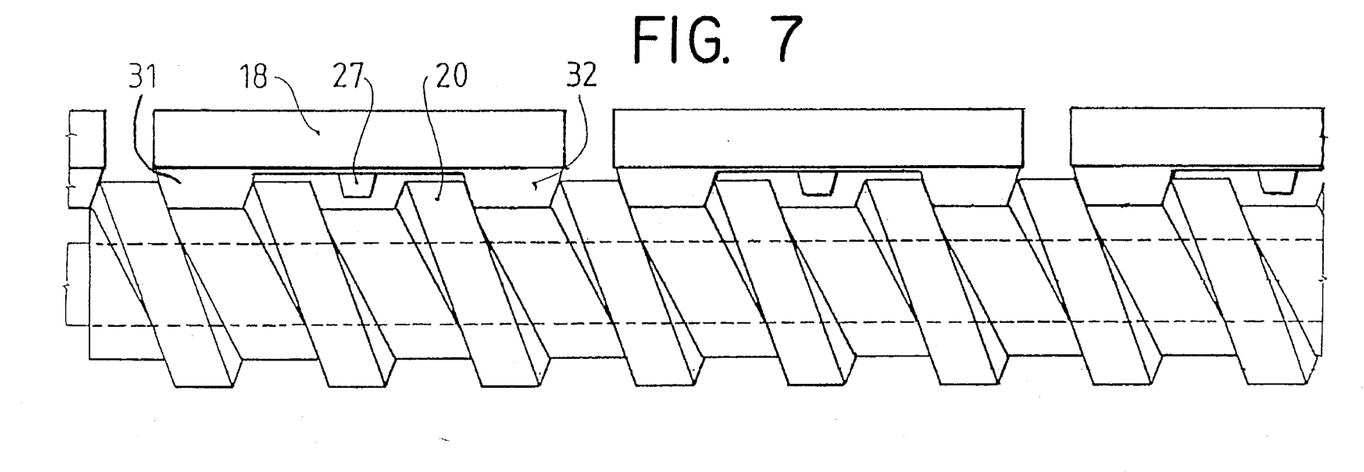
FIG. 7 shows a view of a number of molds with the studs which engage with the turns of the conveying screw.

FIG. 7 shows that the screw 20 is manufactured with an acme thread, and the studs 31 And 32 on the mold 18 are advantageously of the same trapezoidal form so that their engagement with the turns of the screw 20 is precise with no looseness.

Still in FIG. 7, it can be seen that the projections 27 do not come into contact with the thread 20 while the molds 18 are being moved along one of the main paths (21, 21'), i.e. along one of the tracks along which the mold 18 and its product undergo the processing operations.

Figure 8:
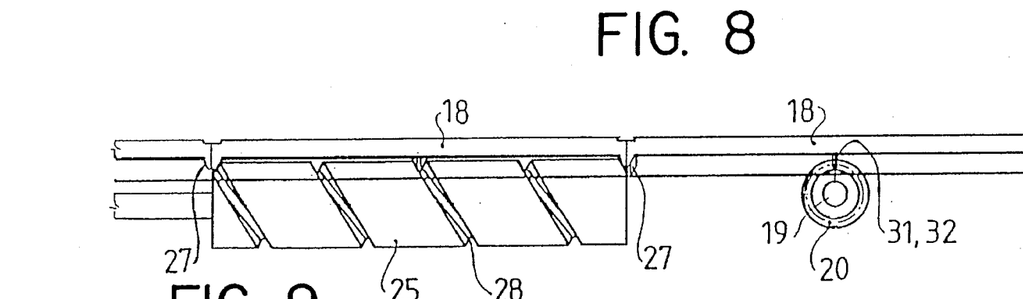
FIG. 8 diagrammatically shows the transverse translation screw of the plant.

FIG. 8 shows the plant viewed in the direction of arrow VIII shown in FIG. 3.

Figure 9:
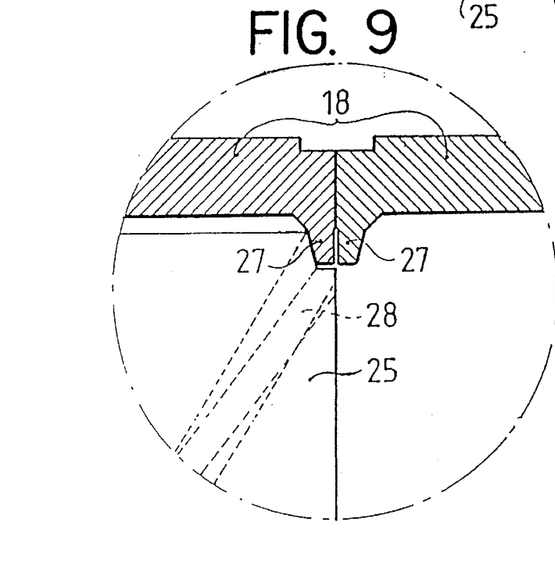
FIG. 9 shows a detail of the transverse conveyor.

The cylinder-and-piston unit 127 that acts on the mold 18 fed by the screw 20 driven by the shaft 19 can be seen clearly. The force of the cylinder-and-piston unit 127 transmitted to the mold 18 has the result that the latter, once its central projection 31, 32 is freed from the screw 20, is taken over by the turn 28 of the screw 25. It can be seen that the terminal studs 27 of the mold 18 engage with a geometrical coupling in the turns 28 of the rotating screw 25. This concept can be seen more clearly in FIG. 9 which illustrates this detail on an enlarged scale. FIG. 9 shows a view of the screw 25 with the turns 28 in which the studs 27 positioned at the centre of the narrow ends of the molds 18 engage.

The plant designed according to the present invention operates in the following manner: by means of the station 3 for feeding the molds 18, the latter are fed to the path 21 that has the lateral guides 16 and 17 for supporting and conveying the molds. When the molds 18 have been deposited on the guides 16 and 17, the stud 31, 32 of each mold 18 comes into engagement with the turns of the screw 20 driven by the shaft 19.

Consequently the molds whose ends are supported by the guides 16, 17 are advanced reliably through the device 4, which heats the molds, and through the device 5 which injects the chocolate mass into the mold 18 wells before passing through a knocking device, denoted 6.

At the end of the path 21, the molds meet an arresting means 26 which defines the position of the mold and emits the signal to activate the cylinder-and-piston unit 127 that displaces the mold 18, whose studs 31 and 32 are simultaneously freed from the turns of the screw 20, towards a screw 25 located in the centre of a path 22 positioned at right angles to the path 21. As a result of the pushing action transmitted to the mold 18 by the cylinder-and-piston unit 127, the central projections 27 engage with the turns 28 which conveys the mold along the transverse path 22.

Next, at the end of the path 22, there is another set of devices that cause the mold to move translationally towards the path 21' (FIG. 1), on which the molds pass through a knocking unit before entering a refrigerator 8 at the exit of which is an inverting device 9, illustrated in greater detail in FIGS. 4 and 5.

Next, after another change of direction of the molds, the latter move through a righting unit before reaching the mold unloading device 2.

Clearly, the auxiliary units 2, 3, 4, 5, 6, 7, 8, 9 and 10 can also be positioned in a different sequence relative to the advancing paths 21, 22 and 21'.

The paths 21, 22, 21' may lie either in a horizontal plane or in a vertical plane.

Owing to the use of a screw, employed as a mold advancing means, the movement of the molds occurs with great precision, and the molds are consequently filled very precisely and with fewer rejects being produced.

The molds 18 can also undergo very high accelerations, such as will increase the productivity of the plant. This is possible because of the use of a conveying screw which makes it possible to effect conveyance of the molds 18, simultaneously with guidance by means of a geometrical coupling between mold and screw.

With a screw being used as the conveying means, ad hoc adjustments and maintenance will be unnecessary because the wear that occurs between the screw and the mold projections is not such as to compromise the proper operation of the advancing device. Moreover the wear is not cumulative as would be the case in chain conveyors.

Owing to the use of a screw as an advancing means, a plant is constructed that is much more hygienic because no lubricants are necessary for the screw and, in addition, cleaning operations can be done continuously and more efficiently.

It is also especially advantageous that, thanks to the use of a screw for mold handling, it will be possible in the molding plant for chocolate or a similar product, to move these molds both forwards and backwards, to the right and to the left, and up and down. Again, it will be possible to invert the molds through 180° by means of a simple inverting device. It is also possible, without modifying the plant, to use casting moulds having different dimensions.

After the mold containing the product has been inverted, the empty mold is held firmly in position because it is locked in the screw itself. Also, during the inverting the mold is held in the desired position by a single plate that forms a housing to receive the mold during the inverting movement.

The use of the screw also makes it possible to make the entire molding plant more flexible, because the molds or supplementary units can be introduced into the path of translation in any position. There is no need to consider the presence of chains or their associated guide wheels and direction-changing wheels.

I claim:

1. A molding plant for molding a product such as chocolate, said plant comprising:
  a plurality of molds for holding the product to be molded, at least one of said molds having a lateral midline and a transverse midline and at least one lateral stud extending downwardly from the region of said lateral midline and at least one transverse stud extending downwardly from the region of said transverse midline;
  at least one processing station for processing the product in said molds; and
  a processing path; wherein:
  said processing path has:
    a first portion comprising a first set of parallel guides and a first drive shaft parallel to and positioned between said first set of parallel guides;
    a second portion transverse to said first portion, said second portion of said processing path comprising a second set of parallel guides and a second drive shaft positioned between and parallel to said second set of parallel guides and transverse to said first drive shaft;
    one of said first and second portions extends through said at least one processing station;
  said first drive shaft conveys said molds along said first portion of said processing path in a direction substantially parallel to said lateral midline when said at least one lateral stud engages said first drive shaft;
  said second drive shaft conveys said molds along said second portion of said processing path in a direction substantially parallel to said transverse midline when said at least one transverse stud engages said second drive shaft;
  said at least one lateral stud is positioned such that when said at least one lateral stud engages said first drive shaft said at least one transverse stud is spaced from said first drive shaft; and
  said at least one transverse stud is positioned such that when said at least one transverse stud engages said second drive shaft said at least one lateral stud is spaced from said second drive shaft.

2. A molding plant as in claim 1, further including a motor coupled to at least one of said drive shafts, said motor causing controlled rotation of said at least one drive shaft in either a clockwise or counterclockwise direction.

3. A molding plant as in claim 1, each of said drive shafts comprising a central shaft and a plurality of advancing screws mounted on said central shaft as separate screw bodies fastened to the respective central shaft at one end only of each of the respective screw bodies to permit expansion and contraction of said separate screw bodies.

4. A molding plant as in claim 1, further comprising arresting stops that selectively generate a signal for activating a transverse displacement unit to displace a mold travelling along one of said first and second portions of said processing path to the other of said first and second portions of said processing path.

5. A molding plant as in claim 4, wherein said transverse displacement unit is formed by a cylinder-and-piston unit.

6. A molding plant as in claim 1, wherein said at least one processing station includes a station for inverting said molds to release the product molded therein and wherein a portion of said drive shaft extends through said inverting station.

7. A molding plant as in claim 6, wherein the portion of said drive shaft extending through said inverting station includes an invertable drive shaft having first and second ends that engage and disengage with ends of adjacent portions of said portion of said drive shaft upstream and downstream of said invertable drive shaft to permit inversion of molds within said inverting station.

8. A molding plant as in claim 7, further comprising a transverse bar pivotably supporting said invertable drive shaft, said transverse bar being rotatable to invert said invertable drive shaft.

9. A molding plant as in claim 7, wherein said invertable drive shaft further includes first and second plates on opposite sides of said invertable drive shaft, said plates forming chambers for accommodating said molds during inversion.

10. A molding plant as in claim 1, wherein at least one of said drive shafts is horizontally mounted.

11. A molding plant as in claim 1, wherein at least one of said drive shafts is vertically mounted.

12. A molding plant as in claim 1, further comprising a barrier, said barrier comprising plates covering said drive shaft and defining a slot through which said at least one stud of each said mold can pass to engage said drive shaft.

13. A molding plant as in claim 1, including a plurality of processing stations including a mold feeding station, a heating station, a metering station, a knocking station, a refrigerating station, an inverting station, and a mold unloading station.

14. A molding plant as in claim 1, wherein at least one of said drive shafts further comprises a central shaft and a plurality of axially spaced advancing screws independently mounted on said central shaft, said molds engaging said at least one of said drive shafts through consecutive engagement with said plurality of screws.

15. A molding plant as in claim 14, wherein said conveying screws have turns, said studs engaging between said turns of said conveying screws.

16. A molding plant as in claim 1, wherein said transverse studs are made in the form of half-bodies.

17. A molding plant as in claim 1, wherein said molds further comprise:

a bottom surface and ribs projecting from said bottom surface of said molds and passing around said parallel guides;

first and second opposed pairs of lateral sides;

an upper surface; and recesses in said upper surface along said first and second lateral sides, said recesses forming connecting seats for said ribs.

18. A molding plant for molding a product including chocolate, said plant comprising:

a plurality of molds, each mold having at least one well for holding the product to be molded, first and second opposed lateral sides, a lateral centerline substantially equidistant from said first and second lateral sides, third and fourth opposed transverse sides, a transverse centerline substantially equidistant from said third and fourth opposed transverse sides, and a bottom surface with at least one stud downwardly extending along at least one of said lateral centerline and said transverse centerline;

at least one processing station for processing said molds; and a processing path extending through said at least one processing station, said processing path comprising parallel guides and a single drive shaft positioned between said parallel guides;

wherein said at least one stud is shaped to engage said drive shaft such that said drive shaft conveys each said mold along said processing path in a direction substantially parallel to the centerline from which said stud engaging said drive shaft extends.

19. A molding plant as in claim 18, wherein:

each said mold includes at least one lateral stud extending along said lateral centerline and at least one transverse stud extending along said transverse centerline;

said drive shaft conveys said molds along said processing path in a direction substantially parallel to said lateral centerline when said lateral studs engage said drive shaft;

said drive shaft conveys said molds along said processing path in a direction substantially parallel to said transverse centerline when said transverse studs engage said drive shaft;

said at least one transverse stud is spaced from said drive shaft when said at least one lateral stud engages said drive shaft; and said at least one lateral stud is spaced from said drive shaft when said at least one transverse stud engages said drive shaft.

20. A molding plant as in claim 19, wherein:

said processing path comprises first and second portions arranged perpendicular to each other, each said portion having a drive shaft, said drive shaft of said portions being arranged perpendicular to each other; and said processing path conveys said molds both in a direction substantially parallel to said lateral centerline of said molds by engagement of said lateral stud and one of said drive shafts and in a direction substantially parallel to said transverse centerline of said molds by engagement of said transverse stud with the other of said drive shafts.

* * * * *